Patented Dec. 13, 1932

1,891,079

UNITED STATES PATENT OFFICE

MARTIN B. CHITTICK, OF CHICAGO, ILLINOIS, ASSIGNOR TO THE PURE OIL COMPANY, OF CHICAGO, ILLINOIS, A CORPORATION OF OHIO

VARNISH AND PAINT OIL MANUFACTURE

No Drawing. Application filed July 2, 1930. Serial No. 465,448.

This invention relates to the manufacture of varnishes and paint oils and has specific application to varnishes or paint oils using mixtures of hydrocarbon polymers and varying amounts of drying oils, such as linseed, tung or Chinawood oil, rapeseed oil and the like by treatment with driers such as lead, cobalt, manganese linoleates, or other metallic soaps. Further, the invention has application to the manufacture of varnishes consisting of hydrocarbon polymers, natural gums, such as kauri gum, and/or synthetic gums, such as ester, and/or drying oils, such as linseed, tung or Chinawood oil, together with driers such as lead oleate or other metallic soaps suitably heat treated.

Hydrocarbon polymers of the type above referred to are obtained from unsaturated hydrocarbon compounds produced as residues from gasolines or motor fuels obtained from high temperature operations. For example, in such operations it is customary to pass gas-oil fractions in a vaporous state through a heated conversion zone wherein the vaporized hydrocarbons are subjected to converson temperatures ranging between 1000° F. and 1250° F., and are afterwards fractionated, condensed and collected to obtain a condensate having the boiling range of gasoline, and which condensate is composed largely of unsaturated compounds. Certain of these compounds, notably the diolefines, are highly reactive and readily combine with oxygen to produce higher boiling compounds known generally by the term "gums" or "polymers". To remove these gums or polymers and to accelerate their formation in such motor fuel condensate, the cracked low-boiling hydrocarbons are preferably passed in a vaporized condition into contact with catalytic or absorptive materials such as fuller's earth, bentonite, infusorial earths, silica gel and analogous substances. These substances apparently exercise a catalytic action on the more reactive unsaturated compounds and produce polymerizing reactions whereby these polymerized compounds, termed "polymers", may be removed through difference in specific gravity from the lower boiling fractions comprising the desired motor fuel condensate or distillate. These gums or polymers, produced by passing vaporized unsaturated hydrocarbons of gasoline boiling range through fuller's earth, possess a higher boiling range than the original condensate or distillate from which they were formed, thus indicating the polymerization promoting character of the catalytic or absorptive materials used in accelerating their formation. The removal of these gums or polymers from the gasoline distillate renders the latter suitable for commercial use and eliminates the possibility of other serious gum formation in such motor fuels when the latter are stored, transported and commercially handled.

Treating operations of the character set forth result in the formation of considerable quantities of these gums or polymers which have but little commercial value and are ordinarily mixed with and used as low value fuel oils. I have discovered, however, that these polymers, which are reactive unsaturated hydrocarbons, unite with oxygen, may be advantageously used in connection with the manufacture of varnishes and paint oils for the purpose of improving the quality thereof and their rate of drying.

As illustrative of the invention and without limiting the scope thereof, the following examples are given disclosing the use of reduced hydrocarbon polymers, of the character above set forth, in varnish or paint oil manufacture. By the expression "reduced hydrocarbon polymers" it will be understood that I refer to polymers obtained substantially by the process above outlined and heated or filtered to liberate therefrom low boiling constituents, leaving as polymers a thick viscous resinous material of high boiling range.

Example 1

Reduced hydrocarbon polymers_____ 6.00 lbs.
Tung (Chinawood) oil_____ 4.00 lbs.
Japan drier (lead and manganese)_____ 1.00 lb.
Turpentine_____ 1.00 pint In mixing these materials, the polymers are added to the tung oil and the temperature of the mixture raised gradually to approximately 300° F. and held at this temperature for substantially one hour, following which the mixture is cooled to a temperature of approximately 200° F. and the japan drier added. The mixture is then reduced to a brushing consistency with approximately one pint of turpentine. Usually, this preparation will dry within five hours' time.

Example 2

| | |
|---|---|
| Reduced hydrocarbon polymers | 6.00 lbs. |
| Tung (Chinawood) oil | 4.00 lbs. |
| Japan drier (lead and manganese) | 1.00 lb. |
| Turpentine | 1.00 pint |

While the materials here given are the same as in Example 1, yet in producing the same I add the polymers to the tung oil and raise the temperature thereof gradually to 400° F. and hold the same at this latter temperature for one hour. The mixture is then cooled to 200° F. and the japan drier added, after which it is reduced to a brushing consistency with one pint of turpentine or naphtha. The drying time required for the varnish amounts to approximately six hours.

Example 3

| | |
|---|---|
| Reduced hydrocarbon polymers | 6.00 lbs. |
| Tung (Chinawood) oil | 4.00 lbs. |
| Japan drier (lead and manganese) | 1.00 lb. |
| Turpentine | 1.50 pints |

Add the polymers to the tung oil and gradually raise the temperature thereof to 500° F. and hold the same for one hour. Cool to 200° F. and add japan drier. Reduce to brushing consistency with 1.5 pints of turpentine. Drying time required for this varnish is seven hours.

Example 4

| | |
|---|---|
| Reduced hydrocarbon polymers | 6.00 lbs. |
| Raw linseed oil | 4.00 lbs. |
| Japan drier (lead and manganese) | 1.00 lb. |
| Turpentine | 0.5 pint |

Add the polymers to the linseed oil and gradually raise the temperature thereof to 300° F. and hold for one hour. Cool to 200° F. and add the japan drier. Reduce to brushing consistency with one-half pint of turpentine. This varnish dries in approximately 10 hours.

Example 5

| | |
|---|---|
| Reduced hydrocarbon polymers | 6.00 lbs. |
| Raw linseed oil | 4.00 lbs. |
| Japan drier (lead and manganese) | 1.00 lb. |
| Turpentine | 0.5 pint |

Add the polymers to the linseed oil and gradually raise the temperature to 400° F. and hold the same for one hour. Cool to 200° F. and add the japan drier. Reduce to brushing consistency with one-half pint of turpentine. This varnish dries in 12 hours.

Example 6

| | |
|---|---|
| Reduced hydrocarbon polymers | 6.00 lbs. |
| Raw linseed oil | 4.00 lbs. |
| Japan drier | 1.00 lb. |
| Turpentine | 0.5 pint |

Add the polymers to the linseed oil and gradually raise the temperature thereof to 500° F. holding the same for one hour. Cool to 200° F. and add japan drier. Reduce to brushing consistency with one-half pint of turpentine. This varnish dries in 14 hours.

Naphtha may be substituted for the turpentine contents set forth in the above examples, and these varnishes are also used for grinding pigments in the manufacture of paints and enamels.

The employment of the hydrocarbon polymers in conjunction with natural and synthetic (ester gums) varnish, is also within the scope of the present invention, as well as the employment of other drying and semi-drying oils such as rapeseed oil and fish oils. It will be understood that the proportions of the ingredients as well as the temperatures and other process factors may be varied from the specific examples above given without departing from the scope of the invention. The present disclosure is likewise applicable to the manufacture of lithographic varnishes.

While I have set forth examples of oils and semi-drying oils, it will be understood that the present invention may be used with various types of fatty oils.

What is claimed is:

The method of producing a varnish, which consists in heating a mixture of substantially six parts of reduced hydrocarbon polymers and four parts of linseed oil to a temperature of between three hundred to five hundred degrees Fah., retaining the mixture at said temperatures for substantially one hour's time then permitting the mixture to cool to a temperature of approximately two hundred degrees Fah., and adding a japan drier and subsequently reducing the mixture to brushing consistency by the addition of turpentine.

In testimony whereof I affix my signature.

MARTIN B. CHITTICK.